L. WILLIAMS & W. S. McKINNIE.
Singletrees.
No. 136,888.                                              Patented March 18, 1873.
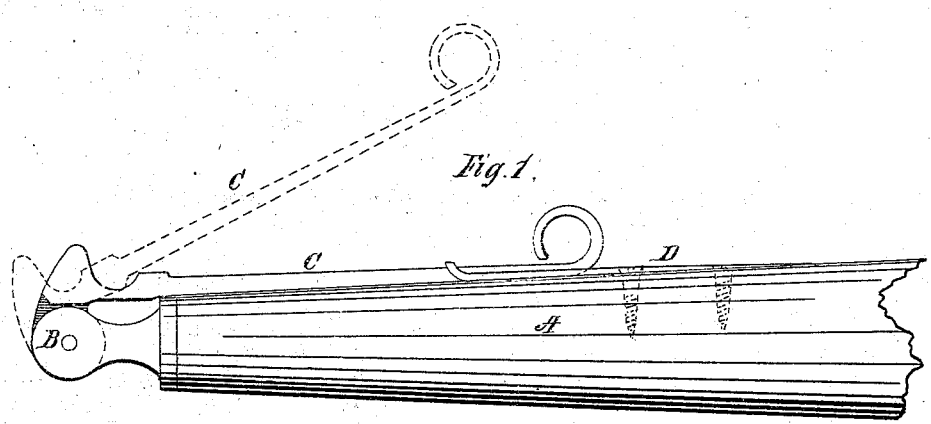
Witnesses.                                                Inventor.
Wm. T. Cramer.                                            Leander Williams
Geo. A. Cramer.                                           Walter S. McKinnie

UNITED STATES PATENT OFFICE.

LEANDER WILLIAMS AND WALTER S. McKINNIE, OF STONELICK TOWNSHIP, CLERMONT COUNTY, OHIO.

IMPROVEMENT IN SINGLE-TREES.

Specification forming part of Letters Patent No. 136,888, dated March 18, 1873.

*To all whom it may concern:*

Be it known that we, LEANDER WILLIAMS and WALTER S. McKINNIE, of Stonelick township, in the county of Clermont, and State of Ohio, have invented certain Improvements in Single-Trees and attachments to shafts of wheeled vehicles drawn by horses, of which the following is a specication:

The first part of our invention relates to the combination of hinged lever and trace-hook in such a manner that the trace can at any time be instantaneously released from the single-tree by the person driving, while the horse and vehicle are in motion or at rest, by means of a small strap, which is fastened to the rings of the levers which are hinged into the trace-hook, and passes around the dash of the vehicle in such a manner that the driver can take hold of it (the strap) without moving from his seat; and by giving said strap a sudden pull said hinged lever is raised out of its clasp-spring in such a manner that the trace is thrown off the hinged lever and trace-hook, and the horse is thereby instantaneously released from the single-tree.

Figure 1 shows a portion of the single-tree.

A, Fig. 1, is the end portion of a single-tree; B, Fig. 1, the trace-hook over which the trace is usually hooked; C, Fig. 1, a lever hinged into trace-hook, and over which the trace is also hooked; D, a steel spring clasping the outer end of lever C to prevent any vibration.

The harness-trace being hooked over the lever on the single-tree and its bearing, and the ring attached to the holdback strap slid upon the hook on the shaft, the horse is securely attached to the vehicle. Upon raising the ring end of the lever by means of the strap aforesaid, the trace is thrown off of the hook and lever, the ring on the shaft-hook slides forward, and the horse is immediately released from the vehicle.

We claim that the main object of our invention is to release the horse from the vehicle to which he may be attached, and that the invention is useful and valuable.

What we claim as our invention, and desire to secure by Letters Patent, is—

1. In a single-tree, the combination of the lever-fastener C, constructed as described, with the trace-hook B, substantially as and for the purpose specified.

2. The combination of the lever-fastener C, the trace-hook B, and the forked spring D, substantially as and for the purpose herein set forth.

LEANDER WILLIAMS.
WALTER S. McKINNIE.

Witnesses:
WM. T. CRAMER,
ELLA CRAMER.